July 8, 1952
S. L. REICHES
2,602,909
MEANS FOR IMPROVING THE DEFINITION
IN THE PRESENTATION OF INTENSITY
MODULATED CATHODE-RAY TUBES
Filed June 23, 1950
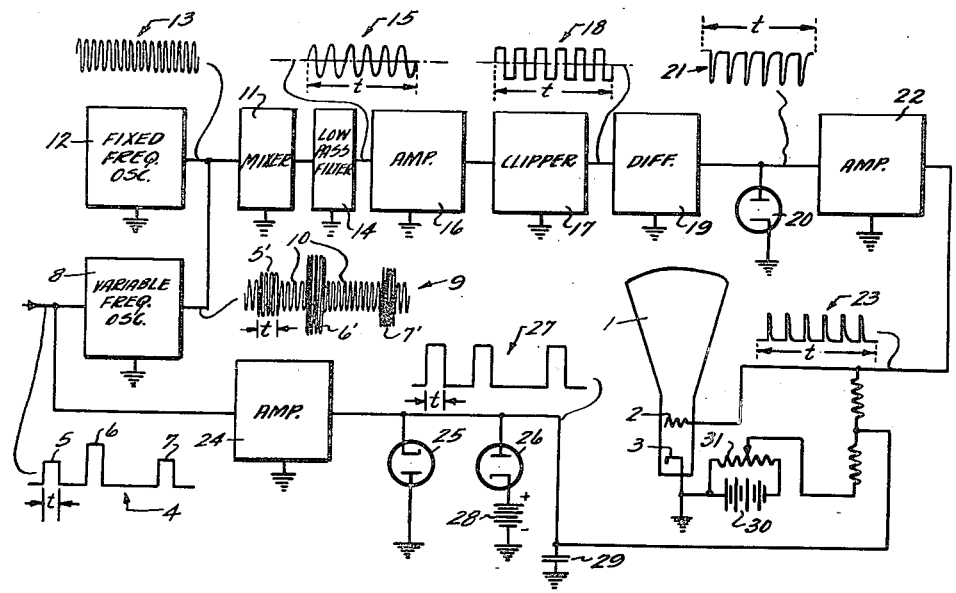
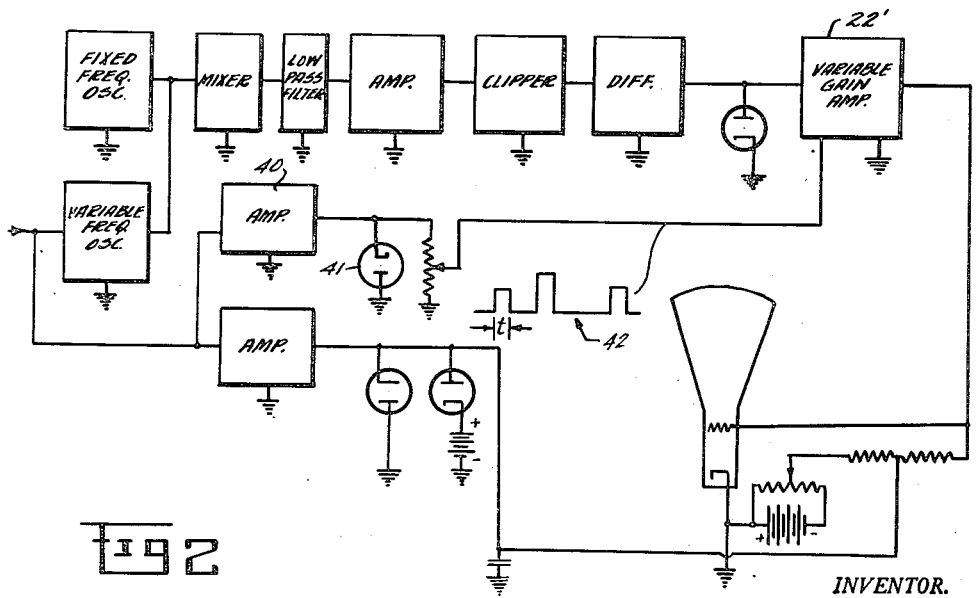
INVENTOR.
SOL L. REICHES

# UNITED STATES PATENT OFFICE 2,602,909

MEANS FOR IMPROVING THE DEFINITION IN THE PRESENTATION OF INTENSITY MODULATED CATHODE-RAY TUBES

Sol L. Reiches, Cleveland, Ohio

Application June 23, 1950, Serial No. 169,952

4 Claims. (Cl. 315—30)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to cathode-ray tube indicator circuits of the type in which a presentation having a considerable amount of detail is produced on the cathode-ray tube screen. It is the object of the invention to improve the definition in such presentations.

Three commonly employed scanning methods used in connection with the cathode-ray tube indicator of radio direction and ranging, or radar, systems are the type B scan, the type C scan and the PPI scan. In the type B scan the electron beam of the cathode-ray tube is moved horizontally in step with the scanning antenna at a comparatively slow rate of speed while at the same time being deflected vertically once for each transmitted pulse. In this presentation the horizontal position, the object representing spot produced by the beam on the screen of the cathode-ray tube, indicates the azimuth, and the vertical position thereof indicates the range of the object. The type C scan is similar to that used in modern television receivers except that the horizontal and vertical scanning frequencies, as well as the number of lines per frame, are much lower than in television. This scan gives information as to azimuth and elevation of the object but does not indicate its range. In the PPI or plan position indication scan the beam is moved radially from the center of the screen to the edge once for each transmitted pulse while at the same time moving circularly in step with a rotating directional antenna. In the presentation produced by this type scan the circular position of the object representing spot on the screen indicates the azimuth of the object and the distance of the spot from the screen center, or other point of origin of the outward beam sweep, indicates the range of the object. In each of the above cases the electron beam of the cathode-ray tube is intensity modulated in accordance with the amplitude of the video signal, the adjustment of the beam intensity at zero video signal being at or just below the threshold of visibility.

In intensity modulated tubes of the above described type two factors operate to reduce the definition in the image produced on the screen. The first factor is the reduced dynamic range of the fluorescent screen of the cathode-ray tube. By this it is meant that the range of intensity between blackout and full brilliancy is not as great as the actual amplitude range of the video signal applied to the beam intensity control electrode. The second factor operating to produce a loss of detail is the defocussing of the beam resulting from the intensity modulation thereof by the video signal. This causes a spot on the screen that represents a particular point to blur over into an adjacent point which, in addition to causing a loss of detail, also causes a spot produced by a strong reflection from a small object to be larger than that produced by a weaker reflection from an object of the same size but lesser reflective index, thus giving an erroneous indication of the relative sizes of the objects.

In accordance with the invention an improvement in definition is obtained by composing each "point" in the image of a plurality of dots of equal intensity, the number of which varies in accordance with the amplitude of the received video signal. The size of a "point" in this case is determined by the distance on the screen occupied by the minimum resolvable object of the particular radar system. The minimum resolvable object in turn is determined by the width of the beam radiated by the antenna and the minimum range. The required dots are produced on the screen of the cathode-ray tube by applying to the beam intensity control electrode a series of constant amplitude pulses which vary in frequency in accordance with the amplitude of the received video signal. Since the amplitude of the pulses applied to the beam intensity control electrode does not change there is no defocussing of the electron beam and the above described undesirable results produced thereby are avoided. Further, by representing varying intensities by varying the number of dots in each "point," the dynamic range of the fluorescent screen is increased. In a modification of the invention intensity modulation of the electron beam is employed along with pulse frequency modulation to increase the dynamic range still further. The degree of intensity modulation in this case is kept below the point at which serious defocussing of the beam would occur.

The details of the invention will be more fully explained in connection with the specific embodiments thereof shown in the accompanying drawings, in which Fig. 1 shows a cathode-ray tube indicator circuit employing pulse frequency modulation of the electron beam; and Fig. 2 shows a cathode-ray tube indicator circuit employing both pulse frequency modulation and intensity modulation of the electron beam.

Referring to Fig. 1 a cathode-ray tube indicator circuit for use in a radar system is shown. The cathode-ray tube 1 has a beam intensity control electrode 2 and a cathode 3. It is to be understood that the tube is also equipped with a suitable beam deflecting circuit for producing a desired scanning pattern, such as the B, C or PPI types already discussed. Since the beam deflecting apparatus does not form a part of the invention it is not shown in the drawing. The wave form at 4 represents a typical video signal obtained from the output of the radar receiver. In the example shown the signal contains pulses 5, 6 and 7 representing reflections from objects at various ranges. The amplitude of each of these pulses is determined by the range and reflective index of the reflecting object and will normally differ more or less from the amplitudes of the other pulses. In conventional intensity modulated cathode-ray tube indicators the signal 4, after amplification, is applied directly to the beam intensity control electrode of the cathode-ray tube. However, in accordance with the invention the signal 4 is applied to variable high frequency oscillator 8.

Oscillator 8 may be any suitable high-frequency oscillator capable of being frequency modulated over the required range, and the specific design thereof is not a part of the invention. The wave form 9 represents the output of oscillator 8. During periods of zero video signal oscillator 8 operates at its minimum frequency, to be defined later, which is represented at 10 in the wave form 9. In the presence of a video signal the oscillator frequency increases in proportion to the amplitude of the video signal so that pulses of high frequency energy 5', 6' and 7', corresponding to video pulses 5, 6 and 7, occur. The amplitude of the high frequency energy in pulses 5', 6' and 7' is shown greater than that of the high-frequency energy produced in the absence of a vido signal and shown at 10 since it is assumed that some amplitude modulation will accompany the frequency modulation of oscillator 8. The output of oscillator 8 is applied to mixer 11 to which is also applied the constant frequency output of a fixed high frequency oscillator 12. The constant frequency output of oscillator 12 is represented at 13. A fixed relationship, which will be defined later, exists between the frequency of oscillator 12 and the minimum frequency of oscillator 8.

The output of mixer 11 contains all the modulation products produced by the intermodulation of the two waves 9 and 13. All of these modulation products except the one having a frequency equal to the difference of the two frequencies applied to the mixer are eliminated by low-pass filter 14. The difference frequency, represented at 15, is amplified in amplifier 16 and applied to clipper 17 which limits the positive and negative half-cycles of the wave to produce the substantially rectangular wave 18. This wave is applied to differentiating circuit 19 which produces sharp positive pulses coincident with the leading edges of the positive half-cycles of wave 18 and sharp negative pulses coincident with the trailing edges of the positive half-cycles of wave 18. The diode 20 eliminates the sharp positive pulses so that a series of sharp negative pulses as shown at 21 are applied to amplifier 22. This amplifier amplifies and inverts the pulses 21 to produce the positive series of pulses 23 which are applied to the beam intensity control electrode 2 of tube 1. It will be noted that the waves 15, 18, 21 and 23 cover the period $t$ of pulses 5 and 5', the time axis having been expanded for purposes of illustration.

It will be evident that the number of pulses in wave 23 during the period $t$ will be dependent upon the amplitude of pulse 5. The minimum frequency of oscillator 8 is set so that for the minimum amplitude of pulse 5 there will be one pulse in wave 23 during the period $t$, corresponding to minimum illumination of a "point" on the cathode-ray tube screen. The maximum frequency of oscillator 8 is set so that for the maximum amplitude of a reflected pulse, such as 5, there will be a predetermined maximum number of pulses during the interval $t$, corresponding to full illumination of a "point" on the screen. The minimum value of difference frequency 15 and the predetermined maximum number of pulses in wave 23 during interval $t$ both depend on various factors which will be discussed later.

During the absence of a video signal the oscillator 8 operates at its minimum frequency which, as pointed out above, is such as to produce one pulse in wave 23 during each interval $t$, or, in other words, to produce pulses on the electrode 2 at a rate of $1/t$ per second. In order to prevent these pulses from being visible on the screen of tube 1 provision is made for rendering the tube inoperative except in the presence of a received video pulse such as 5, 6 or 7. This is accomplished by applying video signal 4 to amplifier 24 and thence to clamping diode 25 and limiting diode 26. These elements act on the video signal to produce a series of rectangular gating pulses 27 corresponding to the pulses of video signal 4 but having a constant amplitude relative to the cathode of tube 1 which is substantially equal to the voltage of direct current source 28. The integrating effect of condenser 29 helps to nullify the effect of any irregularities in the video signal on the continuity of the pulses 27. The intensity control electrode 2 of tube 1 is biased, by means of direct current source 30 and potentiometer 31, sufficiently beyond the cut-off point to prevent the pulses of wave 23 from rendering the beam visible in the absence of a viedo signal. In the presence of a video signal the pulses 27 overcome the above mentioned bias and bring the cathode-ray tube beam just to the threshold of visibility so that the pulses of wave 23 are capable of producing visible spots of light on the fluorescent screen.

In the case of the B and PPI scans the factors determining the length of the interval $t$, the maximum number of pulses in wave 23 during this interval and the maximum and minimum frequencies of wave 15 will be apparent from the following considerations.

As already pionted out the various "points" which form the image on the cathode-ray tube screen are each to be composed of one or more dots of light depending upon the amplitude of the video signal producing the "point." The size of such a "point" is limited by the minimum resolvable distance for the particular radar system as seen on the screen of the cathode-ray tube.

This minimum resolvable distance is in turn dependent upon the minimum and maximum ranges, the length of the cathode-ray tube sweep and the sharpness of the beam radiated by the antenna, in accordance with the following relationship:

$$(1) \qquad P = \frac{2Lr \tan \frac{b}{2}}{R}$$

in which $P$ = minimum resolvable distance as seen on screen
$L$ = length of cathode-ray tube sweep
$b$ = angular width of radiated beam
$r$ = minimum range of system
$R$ = maximum range of system Therefore the distance P defines the dimensions of the largest area on the cathode-ray tube screen that may be considered a "point." Assuming this "point" or unit area to have the width of a dot of light produced on the screen by the electron beam and a length P in the direction of the sweep, minimum illumination thereof would be the condition in which the unit area contained only one dot, and maximum illumination would be the condition in which the unit area contained a predetermined maximum number of dots. The maximum number of dots depends upon the size of P, the diameter of a dot $d$ and the amount of overlap of the dots. The maximum number of dots in a unit area is given by the expression $$(2) \qquad \frac{P}{d}\left(\frac{1}{1-\frac{m}{100}}\right)$$

in which $m$ is the percentage of overlap. The dynamic range of the screen is then given by the expression $$(3) \qquad 10 \log \frac{P}{d}\left(\frac{1}{1-\frac{m}{100}}\right) \text{ decibels}$$

The minimum frequency $f_0$ of wave 15 in Fig. 1, corresponding to minimum illumination of the various "points" or unit areas, is dependent upon the length of the cathode-ray tube sweep L, the size of P and the maximum range R, in accordance with the relation $$(4) \qquad f_0 = \frac{L}{PR \times 10.76 \times 10^{-6}}$$

in which the factor $10.76 \times 10^{-6}$ is the fraction of a second required for an electromagnetic wave to travel out to and back from an object at one mile range. The maximum frequency $f_m$ of wave 15, corresponding to full illumination of the various "points" or unit areas, is dependent upon the length of sweep L, the diameter $d$ of the dot of light produced on the screen of the cathode-ray tube by the electron beam, the degree of overlap between adjacent dots and the maximum range, in accordance with the relation $$(5) \qquad f_m = \frac{L\left(\frac{L}{1-\frac{m}{100}}\right)}{dR 10.76 \times 10^{-6}}$$

in which $m$ is the percentage overlap of adjacent dots.

The basic or zero modulation frequency of oscillator 8 should be high relative to the frequency $(f_m - f_0)$ and the oscillator must be capable of changing its frequency by $(f_m + f_0)$ cycles per second in response to a change in video signal amplitude from zero to maximum. The minimum and maximum frequencies $F_0$ and $F_m$, respectively, of oscillator 8 are therefore $$(6) \qquad F_0 = F_{12} + f_0$$

and $$(7) \qquad F_m = F_{12} + f_m$$

where $F_{12}$ is the fixed frequency of oscillator 12.

The duration of the pulse radiated from the radar antenna in the case of the PPI and B scans should not be less than the time required for the electron beam to sweep over the distance P. The minimum pulse duration, represented by $t$ in Fig. 1, is therefore given by the expression $$(8) \qquad t = \frac{PR 10.76 \times 10^{-6}}{L}$$

As a specific example of the above general treatment consider an air-borne radar system having the following characteristics:

$L$ = 5 inches
$R$ = 10 miles
$r$ = 4 miles (altitude of airplane)
$b$ = 3 degrees Substituting in equation (1)

$$P = \frac{2 \times 5 \times 4 \tan 1.5°}{10} = .1048 \text{ inches}$$

Assuming a dot diameter $d$ of ⅓ millimeter or .0131 inch, which is about the smallest obtainable with present cathode-ray tubes, and an overlap of 50 percent the maximum number of dots per "point," corresponding to full illumination, is found by substituting in expression (2) to be $$\frac{.1048}{.0131}\left(\frac{1}{1-\frac{50}{100}}\right) = 16$$

The dynamic range of the fluorescent screen under these conditions therefore is $$10 \log 16 = 12 \text{ decibels}$$

The minimum and maximum frequencies of wave 15 (Fig. 1), found by substituting in equations (4) and (5), are $$f_0 = \frac{5}{.1048 \times 10 \times 10.76 \times 10^{-6}} = .444 \times 10^6 \text{ cycles per second}$$

and $$f_m = \frac{5\left(\frac{1}{1-\frac{50}{100}}\right)}{.0131 \times 10 \times 10.76 \times 10^{-6}} = 7.1 \times 10^6 \text{ cycles per second}$$

The oscillator 8 therefore must be capable of shifting its frequency over a range of $(7.1 - .444)10^{-6}$ cycles, or approximately 6.7 megacycles, in response to a change in the amplitude of the applied video signal from zero to maximum. After selecting the basic frequency of oscillator 8 the frequency of oscillator 12 may be readily determined from equation (6).

The minimum duration of the transmitted pulse, indicated as $t$ in Fig. 1 is found by substituting in equation (8):

$$t = \frac{.1048 \times 10 \times 10.76 \times 10^{-6}}{5} = 2.26 \text{ microseconds}$$

In applying the invention to a radar system employing a type C scan the requirements are less rigid than in the case of the type B and PPI scans. The reason for this is that in the type C scan the sweep velocity of the cathode-ray tube beam is low compared with that in the type B and PPI scans which give range information. Accordingly in the type C scan the interval $t$ may be made greater without increasing the "point" size above that of the image of the minimum resolvable object.

Fig. 2 shows a modification of Fig. 1 in which beam intensity as well as pulse frequency modulation are applied to the electron beam. The effect of this is to increase still further the dynamic range of the screen. The intensity modulation is accomplished by substituting a variable gain amplifier 22' for the amplifier 22 of Fig. 1 and controlling the gain of this amplifier in accordance with the amplitude of the video signal. The gain control circuit comprises the amplifier 40 to which the video signal is applied, and the clamping diode 41. The clamping diode restores the direct current component to the gain control voltage 42 and fixes its potential relative to ground. The amplifier 22' may be of any suitable design the gain of which may be controlled by a variable voltage. The amount of intensity modulation of the beam is kept below the point at which serious defocussing of the beam would occur, however, the combination of the two types of modulation gives a greater dynamic range than is possible by the use of either type alone.

I claim:

1. In a cathode-ray tube indicator circuit of the type in which the intelligence in a video signal is displayed on the screen of a cathode-ray tube, apparatus for increasing the definition in said display, said apparatus comprising means for blanking the beam in said cathode-ray tube in the absence of a video signal, and means acting in the presence of a video signal for unblanking said beam for short intervals of time at a rate proportional to the instantaneous amplitude of said video signal.

2. A cathode-ray tube indicator circuit comprising a cathode-ray tube having a beam intensity control electrode, a variable frequency oscillator having a video signal applied thereto for frequency modulating the output signal thereof in accordance with the amplitude of the video signal, a fixed frequency oscillator, means for intermodulating the output frequencies of the two oscillators and for selecting the difference frequency from the resulting modulation products, means for generating a train of short duration equal amplitude positive voltage pulses having a repetition rate equal to said difference frequency, means for applying said pulses to said beam intensity control electrode, means for applying a fixed negative blanking voltage to said control electrode of sufficient amplitude to prevent the unblanking of the electron beam by said pulses in the absence of said video signal, and means for removing said blanking voltage in the presence of said video signal whereby said beam is unblanked for the duration of each of said pulses.

3. Apparatus as claimed in claim 2 in which said last-named means comprises means for generating a gating voltage from said video signal, said gating voltage having a fixed amplitude independent of the amplitude of said video signal, and means for applying said gating voltage to said control electrode in opposition to said blanking voltage.

4. Apparatus as claimed in claim 3 in which means are also provided for making the amplitude of the pulses in said train of pulses a direct function of the instantaneous amplitude of said video signal.

SOL L. REICHES.

REFERENCES CITED

The following references are of record in the file of this patent:

UNITED STATES PATENTS

| Number | Name | Date |
|---|---|---|
| 2,202,612 | Urtel | May 28, 1940 |
| 2,235,053 | Urtel | Mar. 18, 1941 |
| 2,285,043 | Messner | June 2, 1942 |
| 2,425,600 | Coykendall | Aug. 12, 1947 |
| 2,443,634 | Morgan | June 22, 1948 |
| 2,444,193 | Gillette et al. | June 29, 1948 |
| 2,458,291 | Munster et al. | Jan. 4, 1949 |
| 2,472,165 | Mankin | June 7, 1949 |
| 2,505,367 | Shaw | Apr. 25, 1950 |